Aug. 3, 1943.  C. DOERING  2,326,016
EDIBLE PLASTIC SUBSTANCE CUTTER
Filed Aug. 13, 1938  4 Sheets-Sheet 1
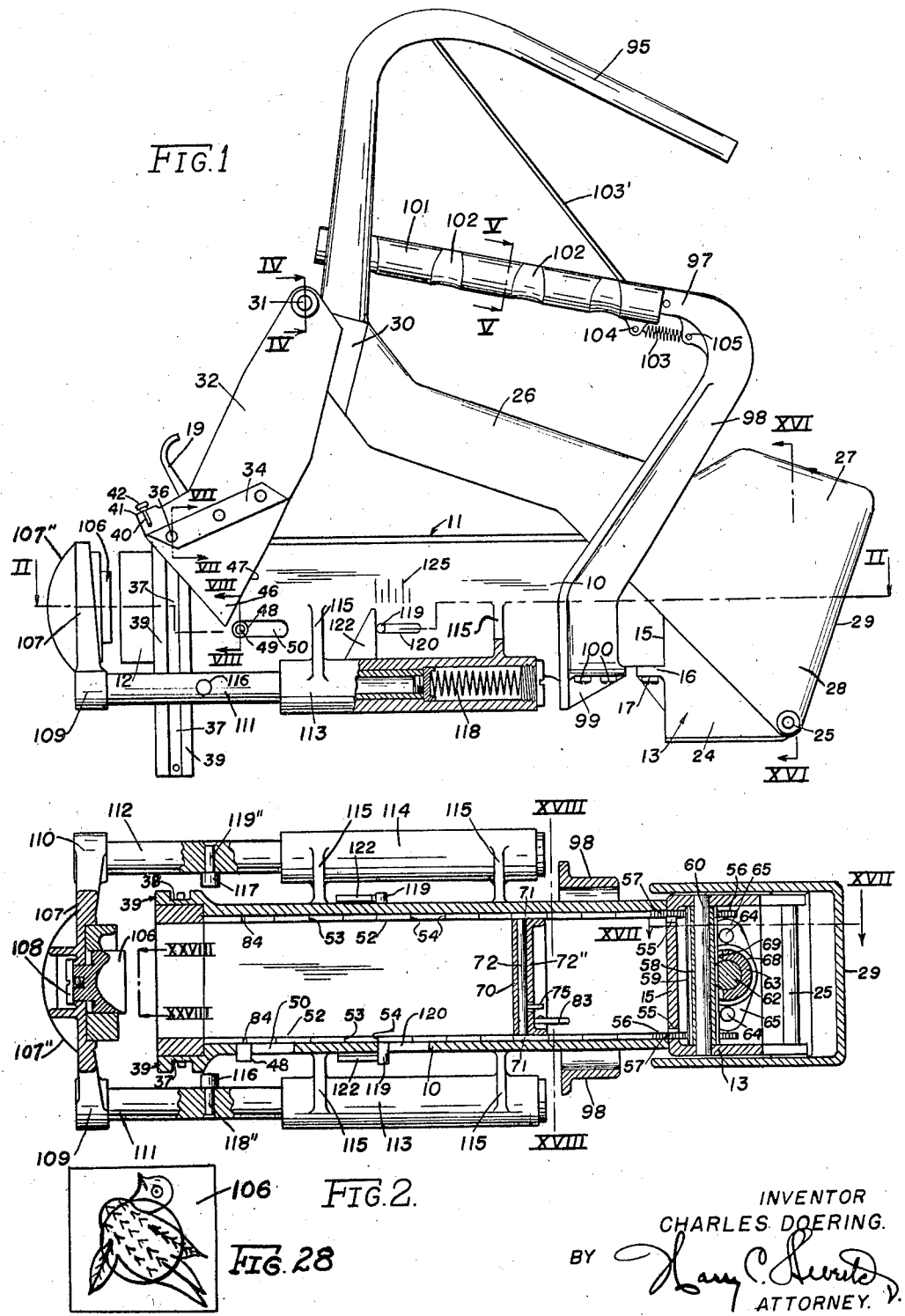
INVENTOR
CHARLES DOERING.
BY
ATTORNEY.

Aug. 3, 1943.  C. DOERING  2,326,016
EDIBLE PLASTIC SUBSTANCE CUTTER
Filed Aug. 13, 1938  4 Sheets-Sheet 2
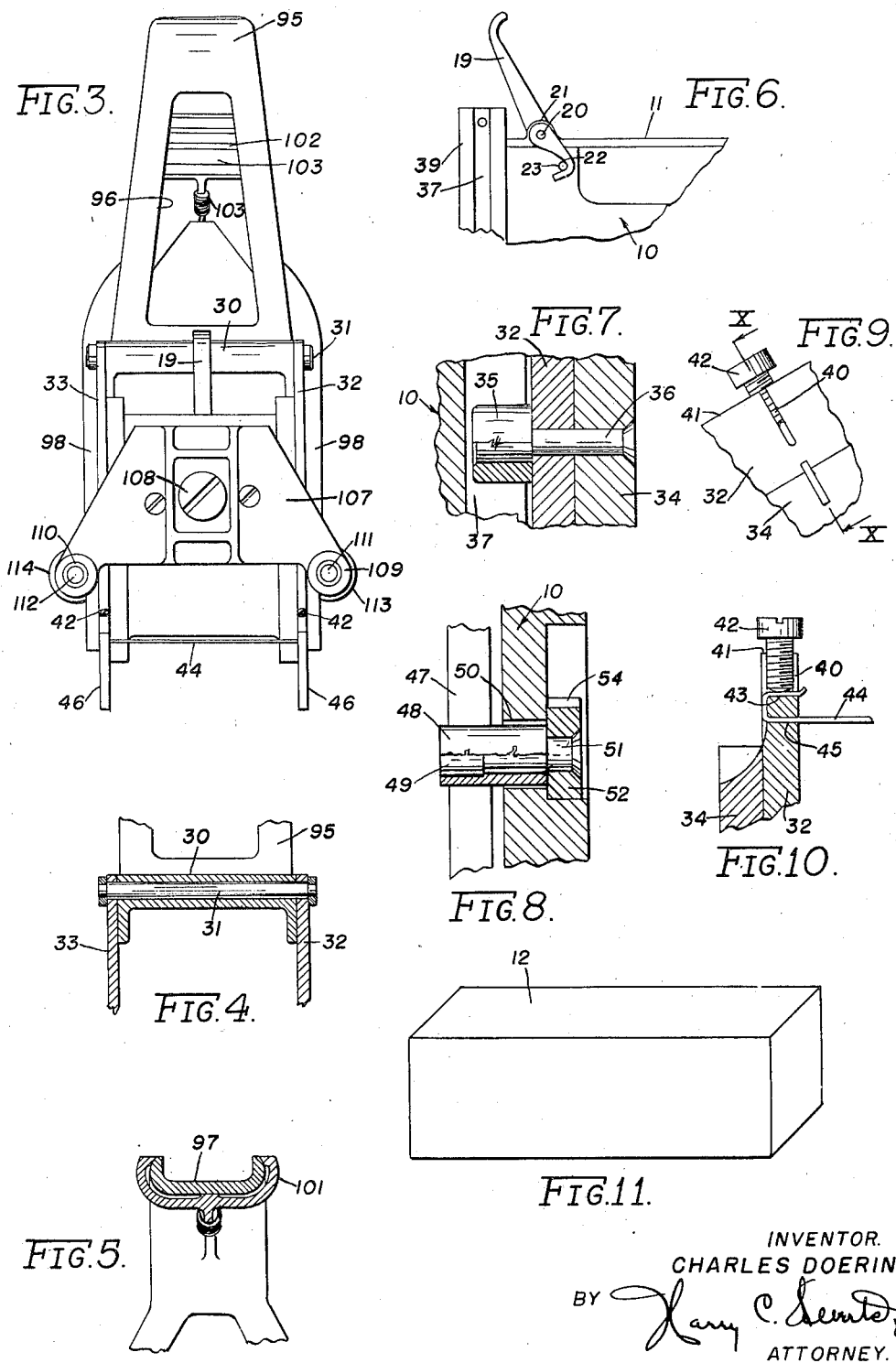
INVENTOR.
CHARLES DOERING.
BY Harry C. Leentz
ATTORNEY.

Aug. 3, 1943.    C. DOERING    2,326,016
EDIBLE PLASTIC SUBSTANCE CUTTER
Filed Aug. 13, 1938    4 Sheets-Sheet 3
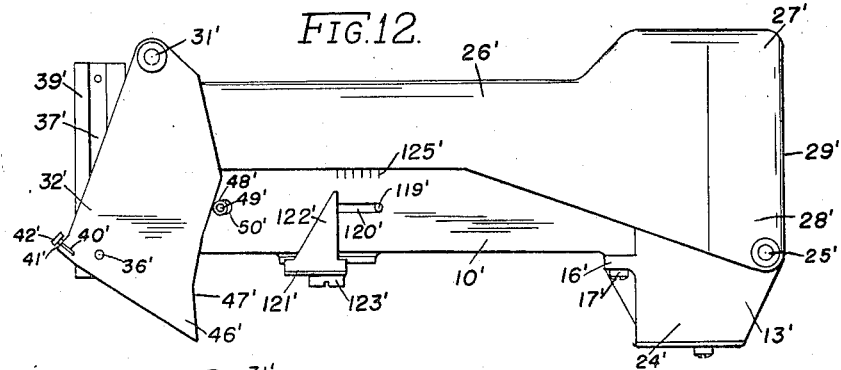
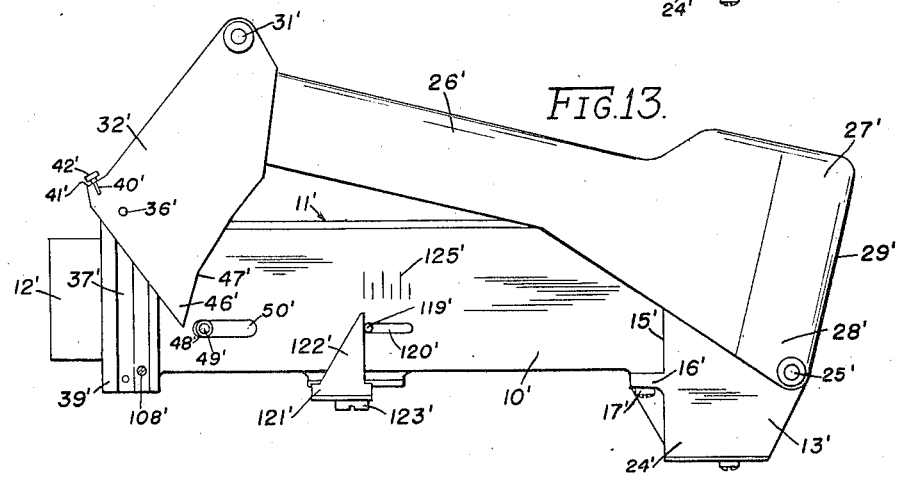
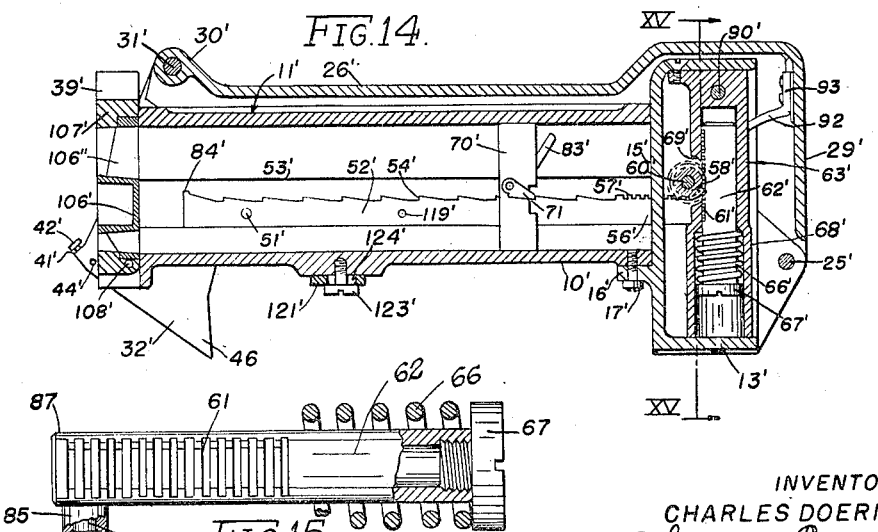
INVENTOR.
CHARLES DOERING.
BY
ATTORNEY.

Aug. 3, 1943.   C. DOERING   2,326,016
EDIBLE PLASTIC SUBSTANCE CUTTER
Filed Aug. 13, 1938   4 Sheets-Sheet 4
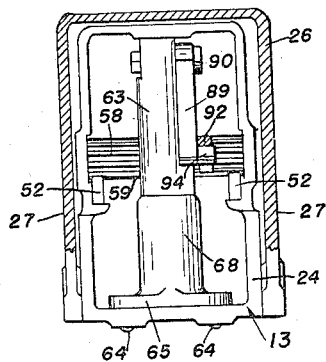
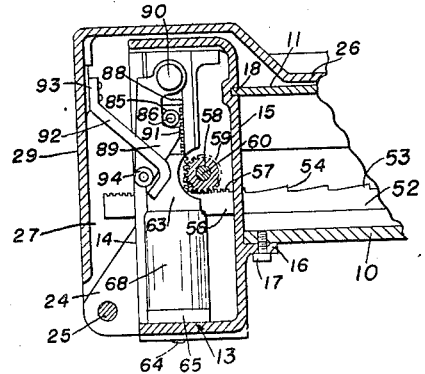
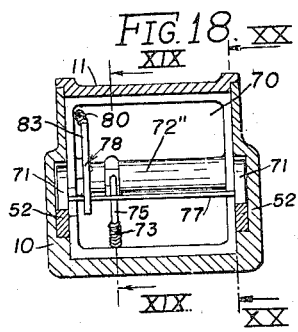
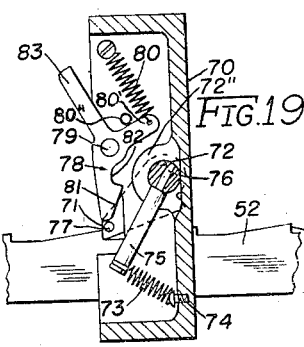
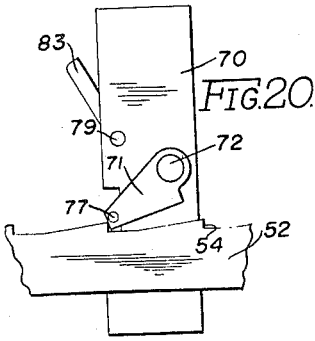
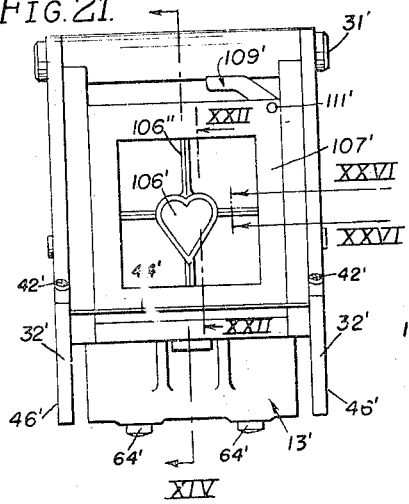
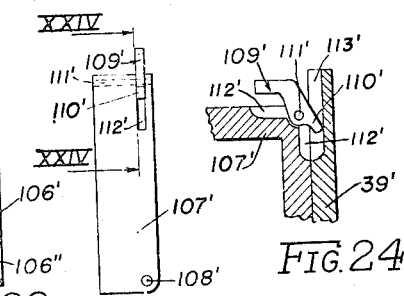
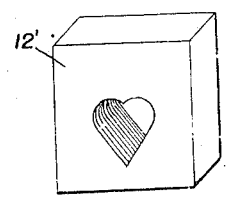
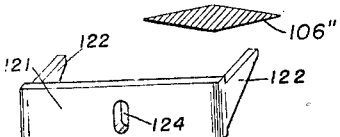
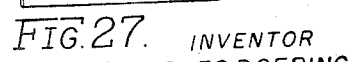
INVENTOR
CHARLES DOERING.
BY Harry P. Leemis
ATTORNEY.

Patented Aug. 3, 1943

2,326,016

UNITED STATES PATENT OFFICE 2,326,016

EDIBLE PLASTIC SUBSTANCE CUTTER

Charles Doering, Chicago, Ill.

Application August 13, 1938, Serial No. 224,833

13 Claims. (Cl. 31—20)

This invention relates to plastic substance cutters and more particularly to portable butter cutters, although certain features thereof may be employed with equal advantage for other purposes.

It contemplates more especially the provision of novel portable means for confining a preformed unit of the edible substances for convenient severance into polygonal segments of pleasing appearance with utmost sanitation.

It has been customary to form edible plastics such as butter and kindred substances into rectangular bricks or segments of varied size; however, these necessitate transverse and longitudinal severance with auxiliary devices to create rectangular segments primarily for unit consumption. Auxiliary devices of known construction require manual operation so that practically every segment must be touched with the human hands in order to effect its formation and serving on a plate. This is not conducive to the sanitary handling of edible substances and, further, does not afford variations in design or contour. Known print cutters of a portable character usually are restricted to a predetermined shape imparted to the extruded substances and this contour is only utilitarian and does not enhance the appearance thereof, which is an important factor in creating and increasing the customer demand therefor.

The novel formation of edible plastics of varied design serves to impart a unique and far more pleasant appearance thereto. This is desirable in that it increases the consumption of such substances, and renders the use thereof a decided advantage in restaurants, at banquets and other gatherings where unique dress of the edibles is a primary and important feature from the patron's standpoint.

Then, too, it is exceedingly advantageous to provide a self-contained portable unit which extrudes and dispenses the portable segments of edible substances such as butter without being touched by the attendant so as to eliminate all possible contamination from this source. Not only is this conducive to utmost sanitation, which is an important factor, but further eliminates considerable labor heretofore neecssary in rendering such available to the patron. These substances are normally unstable unless subjected to refrigeration up to the time of their consumption and the entire dispensing and segment forming unit can be confined in the refrigerator while not in use, and removed therefrom for the purpose of dispensing such to patrons as desired for immediate consumption with utmost sanitation, minimum entailment of labor, and without any appreciable delay.

One object of the present invention is to provide novel means for forming plastics into predetermined palatable units for direct consumption.

Another object is the formation of plastic units of varied design to impart a unique and pleasing appearance thereto with utmost sanitation.

Still another object is the provision of self-contained manually operated means for enabling the ready formation of edible substances into units of any selected design for direct dispensing to the patron.

A further object is the formation of edible substances into units of varied design directly from a portable dispenser without entailing much labor or expense.

A still further object is the provision of novel means for dispensing edible plastics of palatable appearance and effecting the placement thereof on a patron's plate with utmost sanitation and without handling.

Still a further object is to provide a self-contained portable plastic expelling and cutting unit that effects the formation and placement of palatable edible units or segments without individually handling or entailing any appreciable time.

Other objects and advantages will appear from the following description of an illustrative embodiment of the present invention.

In the drawings:

Figure 1 is a side view in elevation of a plastic expelling and cutting device embodying features of the present invention, parts thereof being broken away to clarify the showing.

Figure 2 is a perspective view taken substantially along line II—II of Figure 1.

Figure 3 is a front view in elevation of the device shown in Figure 1.

Figure 4 is a sectional view taken substantially along line IV—IV of Figure 1.

Figure 5 is a sectional view taken substantially along line V—V of Figure 1.

Figure 6 is a fragmentary side view of the top housing closure lever latch for the housing covers shown in Figures 1 and 3.

Figure 7 is an enlarged sectional view taken substantially along line VII—VII of Figure 1.

Figure 8 is an enlarged sectional view taken substantially along line VIII—VIII of Figure 1.

Figure 9 is an enlarged fragmentary side view of the wire cutter holder shown in Figure 1.

Figure 10 is an enlarged fragmentary sectional view taken substantially along line X—X of Figure 9.

Figure 11 is a perspective view of the formed mass of edible substances that is received in the device shown in Figures 1 and 2 for severance into palatable segments.

Figure 12 is a side view in elevation of a plastic print cutter of modified design.

Figure 13 is a view similar to Figure 12 showing the housing member in position for operation to dispense plastic substances prior to effecting the severance thereof.

Figure 14 is a sectional view taken substantially along line XIV—XIV of Figure 21.

Figure 15 is an enlarged view in elevation of a pintle viewed substantially from line XV—XV of Figure 14, parts thereof being broken away to clarify the showing.

Figure 16 is a sectional view taken substantially along line XVI—XVI of Figure 1.

Figure 17 is a sectional view taken substantially along line XVII—XVII of Figure 2 with the actuator in closed position and showing from left to right corresponding parts of Figure 2 shown from right to left.

Figure 18 is a sectional view taken substantially along line XVIII—XVIII of Figure 14.

Figure 19 is an enlarged sectional view taken substantially along line XIX—XIX of Figure 18.

Figure 20 is an enlarged fragmentary view in elevation taken substantially along line XX—XX of Figure 18.

Figure 21 is a front view in elevation of the device shown in Figure 13.

Figure 22 is a sectional view taken substantially along line XXII—XXII of Figure 21.

Figure 23 is a side view of the adaptor housing for the cutter holder shown in Figure 22.

Figure 24 is a somewhat enlarged fragmentary sectional view taken substantially along line XXIV—XXIV of Figure 23.

Figure 25 is an enlarged perspective view of a palatable segment expelled and cut from a device of the type shown in Figure 21.

Figure 26 is an enlarged sectional view taken substantially along line XXVI—XXVI of Figure 21.

Figure 27 is an enlarged perspective view of an adjustable stroke limit stop used in conjunction with the devices shown in Figures 1, 2, 12 and 13.

Figure 28 is a front view of the embossing die viewed substantially from line XXVIII—XXVIII of Figure 2 (sheet 1 of drawings).

The structure selected for illustration comprises an elongated tubular housing 10, in this instance of substantially U-shaped cross-section to receive a closure or cover 11 along the upper open side thereof to confine a preformed print of an edible plastic such as butter 12 therein (Figure 11). The size and shape of the housing 10 together with its cover 11 are determined by the contour of the initial plastic unit 12 which is to be converted into palatable prints or units for consumption in the customary manner. The edible substances such as butter are generally produced in prints weighing from one-quarter pound to one pound and these are available on the market in wrapped units approximating the dimensional extent and contour of the unit 12 illustrated in Figure 11. Such should be construed as merely illustrative rather than a limitation upon the type of preformed prints that can be utilized in conjunction with the housing 10 and its cover 11 serving as a part of a portable plastic print cutter that directly serves any desirable shape or type of palatable segment for placement upon a plate. The vertical grooves 37—38 serve as guides for the rollers 35 that govern the movement of the spaced plates 32—33 carrying the tensioned segment severing wire 44 therebetween.

As shown, the housing 10 terminates rearwardly into a casing 13 having an open end 14. The confronting closed end 15 has a flange 16 formed thereon to receive the housing 10 which is attached thereto by means of threaded stud fasteners 17. The housing closure plate 11 has its rear wall edge disposed in a correspondingly shaped horizontal groove 18 that is formed in the closed end 15 of the casing 13 to serve as a mount therefor. The forward edge of the closure plate 11 is fitted with a lever 19 mounted on a pin 20 journalled in posts 21 formed on the closure plate 11. A pair of latch arms 22 are fixed to the pin 20 for displacement responsive to the lever 19, thereby effecting the cooperation of the latch arms 22 with pins 23 fitted in the side walls of the housing 10 (Figure 6).

It will be apparent, therefore, that the closure plate 11 can be readily removed or attached to render accessible or enclose the interior of the housing 10 for placement of the preformed plastic substances 12 therein through the upper wall thereof. The side walls of the end casing 13 terminate in rearwardly extending ears 24 (Figure 1) to carry a transverse pin 25. An actuator member 26 is disposed above the housing 10, it being of arcuately convex cross-section to terminate in an enlarged tubular extremity 27 having spaced sides 28 for pivotal engagement with the pin 25 carried by the end casing 13, thereby pivotally mounting and connecting the actuator 26 relative to the side walls 24 of the casing 13 in spaced relation thereover, it normally having a closed end wall 29 to completely enclose the open end 14 of the casing 13.

The forward end of the actuator 26 terminates in an upwardly inclined extremity 30 that is pivotally mounted to a pin 31. The actuator extremity 30 with the pin 31 is disposed between spaced plates 32—33 that have guide roller mounting plates 34 fixed thereto (Figure 1) to carry rollers 35 mounted on pins 36 that project through the side plates 32—33 and are anchored in the mounting plates 34. The confronting rollers 35 on the spaced plates 32—33 register with vertical grooves 37—38 formed in a peripheral ridge 39 constituting a part of the open end of the housing 10.

It is to be noted that the peripheral ridge 39 on the housing 10 extends downwardly therebeyond to serve as a shank for the rollers 35 to guide the displacement of the spaced plates 32—33 responsive to the actuator 26. To this end, the peripheral ridge 39 on the housing 10 extends downwardly for a distance to serve as a resting support for the housing 10 in conjunction with the lower end of the end casing 13 (Figure 1) to facilitate the displacement of the actuator 26 and its connected parts. The spaced plates 32—33 are provided with threaded bores 40 that extend in a direction normally to the top edges 41 thereof to receive threaded studs 42 therein to engage the reversely bent extremities 43 of the connecting wire 44 that is tensioned between the spaced wire mounting plates 32—33.

To this end, the wire mounting plates 32—33 are each provided with a wire receiving aperture 45 therethrough so that the reversely bent wire extremity 43 can project therethrough and around the plates 32—33 for lodgement in the threaded bores 40 to become engaged therein by the extremities of the studs 42 so as to retain the cutting wire 44 taut just beyond the peripheral guide ridge 39 of the housing 10 to sever the edible plastic substance 12 expelled therethrough in a manner which will be more fully described hereinafter. It will be observed that the spaced severing wire mounting plates 32—33 and the downwardly extending pointed extremities 46 thereof define inclined camming edges 47 disposed in the path of rollers 48 mounted on stub shafts 49 that extend through elongated horizontal slots 50 provided in the side walls of the housing 10.

As shown, the stub shafts 49 (Figures 2 and 8) have reduced extremities 51 that are anchored to rack bars 52 disposed in elongated side grooves 53 provided in the confronting side walls of the housing 10. Each of the rack bars 52 has an upper serrated edge to present a series of inclined teeth 54. The rack bars 52 are supported in the inside side grooves 53 of the confronting side walls of the housing 10. The rack bars 52 project through slots 55 in the end wall 15 of the end casing 13. Those portions 56 of the racks 52 which extend into the end casing 13 (Figure 2 and 17) are provided with teeth 57 along the upper edge thereof for meshing engagement with corresponding teeth 58 formed on an elongated tubular pinion 59 carried by the shaft 60 which is journalled transversely through the side walls of the end casing 13 (Figures 2 and 17).

The teeth 58 on the pinion 59 mesh, in turn, with rack teeth 61 formed on the open side of a pin 62 (Figures 2 and 15) that is mounted in a cylinder 63 disposed transversely in and attached to the upper and lower walls of the end casing 13, it being secured therein by means of fasteners 64 extending through a flange 65 constituting a part of the cylinder 63 (Figure 2). In consequence thereof, the movement of the racks 52 will displace the pin 62 against the urge of the spring 66 that envelops the pin 62 proximate to a detachable head 67 that lies in an aperture 68 of the cylinder 63. The cylinder 63 is cut away as at 69 to render the teeth 61 accessible to the pinion 59 that meshes therewith.

To this end, the interruption 69 in the cylinder 63 accommodates a portion of the pinion 59 so that an operative connection is established between the movement of the rack 52 and the pin 62, its enveloping spring 66 serving to return the parts to their initial position preparatory to another feeding stroke as will appear more fully hereinafter. In order to feed the plastic print 12 along a predetermined path to expel the substance beyond the forward peripheral frame or ridge 39 of the housing 10, a plunger 70 corresponding in shape and size with the inner section of the housing 10, is disposed therein to cooperate with the racks 52 (Figures 19 and 20).

The plunger feeder 70 is provided with a pair of pawls 71 that are pivoted to the sides thereof by means of a pin 72 extending through a boss 72'' integrally formed on the piston of feeding plunger 70. The pawls 71 are disposed in the path of the teeth 54 on the rack bars 52, they being normally disposed for engagement therewith by means of a spring 73 that is anchored as at 74 to the piston 70 (Figure 19). The other end of the spring 72 engages the lever 75 that is of reduced extremity 76 projecting through the pin 72 so as to normally urge such in a counter-clockwise direction (viewed in Figures 19 and 20). The pawls 71 are connected by a pin 77 lying in the path of the bell crank lever 78 mounted on pin 79 to urge such in a counterclockwise direction responsive to a spring 80. To this end, the spring 80 has one end anchored to the piston 70 and the other end is connected to the lever arm 80' to normally maintain the bell crank lever 78 against the stop pin 80''.

The bell crank lever 78 has an arm 81 that cooperates with the pin 77 on the pawl 71, there being a notch 82 provided therein to surround and retain the pawl pin 77 after the piston 70 has reached the extreme limit of its stroke coincident with the engagement of the handle 83 of the bell crank 78 with the end wall 15 of the end casing 13. This will be the initial position of the piston 70 after the housing 10 has been filled with a correspondingly sized plastic print 12 with the pawls 71 released to engage the teeth 54 on the racks 52. When the piston 70 reaches its other extreme position coincident with the ejection of the last segment of plastic substance 12, the pawls 71 ride up on the elevated extremities 84 of the rack bars 52 corresponding with the extremities 84' of the rack bars 52' of the modification shown in Figure 14, so as to place the pawl pin 77 in the notch 82 of the bell crank lever 78, thereby retaining the pawls 71 out of engagement with the rack teeth 54 so as to permit the piston 70 to return to its initial position against the end wall 15 of the casing 13 coincident with the placing of another plastic print 12 therein.

The apparatus is provided with means to prevent the plunger 70 from expelling the butter on the upward stroke of the actuator and the cutting wire 44 until the cutting wire is clear of the butter bar. Associated with the pin 62, the cylinder 63, and the spring 66, described above, is a locking pawl 89 pivoted to the stud 90. A stud 86, fixed to the vertically slidable pin 62, projects outwardly through a slot 88 in the pin cylinder 63 and has a roller 85 adapted to engage the pawl 89 at the upper surface of the tongue 91 and lock the pin 62 in its upward position. The trip 92 is secured at the base 93 to the wall 29 of the actuator 26 and has a hook-like forward portion so positioned as to engage a roller 94 rotatably mounted on a stud fixed to the pawl 89 and thus to swing the pawl and disengage the tongue 91 from the roller 85 when the actuator 26 is raised.

In operation, as the actuator 26 is swung downwardly toward the housing 10, to cut and impress the butter bar, the trip 92 moves so as to permit the pawl 89 to swing under the influence of gravity, when the device is held in the normal position of use, and to permit the upper surface of the tongue 91 to lock the roller 85 in its upper position. As the actuator moves downwardly, the rack bars 52 raise the pin 62 and thereby the roller 85, so that the pin 62 is locked in its upper position, against the force of spring 66. When the actuator is moved upwardly, the rack bars 52 make their feeding stroke, and the pin 62 is held locked until the trip 92, near the end of its motion, pulls aside the locking pawl 89 and releases the pin 62, and thus permits the rack bars, under the influence of the spring 66, to move suddenly, and to move the feeding plunger 70.

The piston 70 is progressively displaced over the racks 52 by the downward stroke of the actuator 26 which operates the spaced plates 32—33 with their camming edges 47 against the rollers 48 to effect the recession of the racks 52 for a distance commensurate with the length of the elongated slots 50 in the housing 10. During this recession or movement of the racks 52, the piston pawls 71 ride over the rack teeth 54 to effect engagement with the rack teeth 54 therein. As a result, the spring 66 on the pin 62 will again expel the substance 12 for the distance of each tooth 54 which is governed by the length of the slots 50.

It will be observed, therefore, that the plastic substance 12 will be partially expelled during the upward stroke of the actuator 26 and separated from the remaining substance confined in the housing 10 by the cutting wire 44, which moves downwardly with the actuator 26 and the spaced plates 32—33 that are guided by the rollers 35 in the grooves 37—38. The displacement of the actuator 26 may be effected by exerting a force thereon relative to the housing 10 with the upward stroke effecting the feeding of the print 12 and the downward stroke accomplishing the impression and cutting operations. In the embodiment shown in Figures 1 and 2 the actuator extension 95 is provided, constituting an angularly bent converging member, which is integrally or otherwise attached to the actuator 26 to the forward extremity 30 thereof.

The extension 95 may be cut out as at 96 to minimize the weight thereof and to accommodate the fixed handle grasping rod 97 that is disposed therebetween and extends in confronting relation with the handle extension 95. The fixed grasping rod 97 terminates in an angularly disposed furcated shank 98 having furcations that are disposed over the actuator 26. The furcations of the shank 98 are attached to the housing 10 and held stationary relative to the actuator 26. To this end, the furcations 98 of the fixed grasping member 97 terminate in transversely extending flanges 99 for contact with the bottom of the housing 10 which is attached thereto by means of fasteners 100 to rigidly support the manual grasping member 97 in confronting relation with the relatively displaceable handle extension 95 that operates the actuator 26 relative to the housing 10 to effect the intermittent expelling and severance of edible plastic units or segments 12.

To facilitate the operation of the handle extension 95 relative to the fixed grasping member 97, the latter is provided with a slidable sleeve 101 (Figures 1 and 5) that is a complement thereof for guidance therealong. A series of transverse finger conforming depressions 102 are provided in the slidable sleeve 101 so that the latter will be displaced relative to the fixed grasping member 97 in the direction of the displacement of the handle extension 95 to avoid friction with the attendant's hands and to facilitate movement. When the handle extension 95 and the actuator 26 are returned to their initial position, the corresponding sleeve 101 is similarly returned through the urge of the spring 103 that is anchored thereto as at 104 while the other extremity of the spring 103 is anchored as at 105 to the fixed grasping member 97. A further separating urge may be exerted between the actuator extension 95 and the fixed member 97 by interposing a flat spring 103' to assist in returning the actuator extension 95 to its initial position.

In order to provide for the forming of any artistic or fanciful designs in the plastic segments 12 prior to their severance by the cutter wire 44, a die 106 is detachably connected to a bracket 107 through the medium of fastener 108. The bracket 107 is provided with fins 107'' on the exterior surface thereof to serve as thermal conductors to the bracket 107. The thermal conductors 107'' more hurriedly elevate the temperature of the bracket 107 with its die 106 by conducting heat of the surrounding atmosphere thereto, thereby rendering the molding and die impressing operation more perfect, since the plastic will be substantially soft to facilitate the impression of the die or mold 106 therein. The die carrier bracket 107 is provided with bosses 109 and 110 at the lower extremities thereof to carry cylindrical rods 111 and 112. The rods 111 and 112 are telescopically disposed in correspondingly shaped guides 113 and 114 integrally or otherwise attached by means of connecting ribs 115 to the side walls of the housing 10 to carry tubular guides 113 and 114 in rigid relation to the displaceable rods 111 and 112.

As shown, rollers 116 and 117 are journalled on studs 118 and 119 that are anchored in confronting relation in the rods 111 and 112. The rollers 116—117 are disposed in the path of the roller follower bars 34 carried by the spaced plates 32—33. Consequently, when the actuator 26 is displaced responsive to the grasp of the handle extension 95, the bars 34 impinge against the rollers 116—117 to displace the die 106 and cause the previously expelled plastic substance 12 to have an impression formed thereon. When the bars 34 ride beyond the rollers 116—117 of the die bracket rods 111—112, coil springs 118 mounted in the tubular guides 113—114 return the die 106 with its bracket 107 to its initial position preparatory to severance effected by the cutter wire 44 operating through the plastic substance 12.

It will be observed, therefore, that any desired impression of a fanciful or ornamental or attractive character may be impressed in each plastic unit or segment 12 prior to its severance and discharge into a plate or other utensil for consumption without any required contact of the attendant's hand or fingers therewith. In order to predetermine the thickness of the segments to be severed from the plastic print 12, displacement control mechanism is provided. In this instance, the displacement control mechanism comprises pins 119 that are anchored to the racks 52 to project through slots 120 provided in the side walls of the housing 10. A U-shaped member (Figure 27) comprising a bottom plate 121 having upstanding wedge-shaped projections 122 is fixed to the bottom of the housing 10 by means of a cap screw 123, that corresponds with the cap screw 123' of the modification shown in Figures 12 and 14, and that projects through the elongated slot 124 provided in the bottom plate 121 to render it adjustable relative to the pins 119 projecting outwardly from the racks 52. Consequently, the wedge shaped members 122 will control the limit of movement of the racks 52 through the pins 119 and the distance traversed within the limits of each stroke may be designated by calibrations 125 provided on the side walls of the housing 10.

The actuator 26 and handle extension instrumentalities therefor (designated by numerals 95 to 104) may be dispensed with to effect the extrusion of the plastic substance 12' therefrom (Figure 25) in the modified embodiment shown in Figures 12, 13 and 14 wherein corresponding instrumentalities are utilized. In this modified embodiment, like parts are identified with corresponding numerals which are primed to differentiate from the designated corresponding numerals shown in conjunction with the previous embodiment described supra. The housing 10' is, however, charged with the preformed mass of plastic substance 12' through the front end that has a detachable die 106' carried by a pivotally mounted mold confining frame 107' secured to the pin 108' that extends between the peripheral ridge 39' formed on the front end of the housing 10' (Figure 13).

The frame 107' is retained in its operative position in confronting relation with the open end of the housing 10' by means of a lever 109'. The lever 109' has a latch 110' formed thereon so as to be pivotally mounted on a pin 111' between confronting and cooperating slots 112'—113' formed in the mold frame 107' and housing ridge 39' (Figure 24). Consequently, the mold frame 107' can be released to permit access to the interior of the housing 10' through the front end thereof so that the preformed plastic print 12' can be inserted therein in this manner and permit the use of an integral top housing wall 11' rather than the detachable housing top wall 11 of the preferred embodiment. The mold frame 107' may be provided with any suitable shape of die 106', depending upon the taste and desire of any particular customer, it being shown in heart-shape configuration to form a correspondingly shaped core in each segment 12' that is severed from the plastic print by the actuator 26'. The die 106' is supported by comparatively thin diamond-shaped ribs 106'' that extend radially and terminate in a peripheral edge serving as a complement to the mold frame 107'.

While the radial ribs 106'' will sever the print 12' radially into sections, yet as such extends further through the open end of the housing 10', these sections will be drawn together so as to cohere into a unitary segment or unit substantially as illustrated (Figure 25). With the above arrangements, it will be apparent that the actuator 26' is grasped in the palm of the hand and the housing 10' held with the fingers so that the relative displacement can be effected therebetween in order to progressively extrude the print 12' therethrough and effect the segmentation thereof into units or slabs for discharge on individual plates.

Any form of design can be imparted to the print as it is severed into slabs depending upon the shape of the die 106' which merely constitutes an optional feature that need not be applied should commercial practice so elect or dictate. This modified structure is less expensive than the preferred embodiment, and is more simple in design. In any event, it is proposed that the entire housing 10' with its auxiliary instrumentalities is to be subjected to refrigeration while not in use and merely removed momentarily while plates are to be serviced with slabs of butter or other plastic substances.

Various changes may be made in the embodiments of the invention herein specifically described without departing from or sacrificing any of the advantages of the invention or any features thereof, and nothing herein shall be construed as limitations of the invention, its structural embodiments or concept as to the whole or any part thereof, except as defined in the appended claims.

I claim:

1. In a plastic edible substance dispenser, the combination with an elongated tubular housing for confining a preformed edible substance therein, of a hand grasping lever arm pivotally connected to and conforming substantially in shape with said housing to serve as a cover therefor, means operatively connected to said lever arm for intermittently expelling the preformed substance from said housing, means responsive to said lever arm for embossing the expelled end surface of said preformed substance, and means for severing said substance into uniform segments in timed relation with said expelling means.

2. In a plastic edible substance dispenser, the combination with an elongated tubular housing open at one end for confining a preformed edible substance therein, of a hand grasping lever arm operatively connected to and conforming substantially in shape with said housing to serve as a cover therefor, means operatively connected to said lever arm for expelling the preformed substance from said housing, means for severing said preformed substance into uniform segments in timed relation with said expelling means, and a shaping die detachably associated with the open end of said housing to impart a predetermined shape to the expelled edible substance responsive to the displacement of said lever arm in the direction of said housing.

3. In a portable plastic substance dispenser, the combination with a housing to totally confine a preformed edible substance, of means embodying a rack and pinion for expelling said preformed substance from said housing, means for severing an expelled portion of said preformed substance, and handle means operatively connected to said housing for actuating said severing and expelling means in timed relation with each other responsive to the displacement of said handle means in directions towards and from said housing.

4. In a portable plastic substance dispenser, the combination with an elongated enclosed housing shaped for hand grasp to totally confine a preformed edible substance, of means embodying a rack and pinion for expelling said preformed substance from said housing, means for severing an expelled portion of said preformed substance, a handle operatively connected to and confronting said housing for manual grasp in effecting their approach to operate said expelling and severing means in timed relation with each other, and spring means for returning the parts to inactive positions.

5. In a portable plastic substance dispenser, the combination with an elongated enclosed housing shaped for hand grasp to totally confine a preformed edible substance, of hand operating means and a handle pivoted to said housing, means responsive to movement of said hand operating means for expelling the substance from said housing, means responsive to the movement of said hand operating means in timed relation to the movement of said expelling means for embossing the expelled end surface of said preformed substance, and means responsive in timed relation to said expelling means for transversely severing an expelled portion of said preformed substance.

6. In a plastic edible substance dispenser, the combination with an elongated tubular housing for confining a preformed edible substance therein, of a hand grasping lever arm pivotally connected to and conforming in shape with said housing, means operatively connected to said lever arm for intermittently expelling the preformed substance from said housing, means responsive to movement of said lever arm for embossing the expelled end surface of said preformed substance, means responsive in timed relation to said lever arm and said expelling means for severing said substance into uniform segments, means in said housing for cooperating with said expelling means to limit the extent of each intermittent operation thereof, and means on said housing for designating the amount of movement of said expelling means so that the remaining portion of edible substance in said housing can be determined.

7. In a portable plastic substance dispenser, the combination with a housing to totally confine a preformed edible substance, and fulcrumed handle means operatively connected to said housing for actuating a severing means, of means embodying a rack and pinion for expelling said preformed substance from said housing, means responsive to the actuation of said handle means for embossing the expelled end surface of said preformed substance, means for severing an expelled portion of said preformed substance in timed relation with said expelling means responsive to the displacement of said handle means from its initial inactive position, and spring means for returning the parts to inactive positions.

8. In a portable plastic substance dispenser, the combination with a housing to totally confine a preformed edible substance, of hand operated means for expelling said preformed substance from said housing, means responsive to the return displacement of said hand operated means to its initial inactive position for embossing the expelled end surface of said preformed substance, means for transversely severing an expelled portion of said preformed substance, and fulcrumed handle means operatively connected to said hand operated means for actuating said severing means in timed relation with said expelling means.

9. In a portable plastic substance dispenser, the combination with a housing to totally confine a preformed edible substance, of hand operated means for intermittently expelling said preformed substance from said housing, means responsive to said hand operated means for embossing the expelled end surface of said preformed substance, and means responsive in timed relation to said expelling means for transversely severing an expelled portion of said preformed substance upon the return displacement of said hand operated means to inactive position.

10. In a portable plastic substance dispenser, the combination with a housing to totally confine a preformed edible substance, of hand operated means and a hand grasp pivoted to said housing for intermittently expelling said preformed substance from said housing, means responsive to said hand operated means for embossing the expelled end surface of said preformed substance, and means responsive in timed relation to said expelling means for transversely severing an expelled portion of said preformed substance upon return displacement of said hand operated means to its initial inactive position.

11. In a portable plastic substance dispenser, the combination with an elongated housing shaped for hand grasp and adapted to totally confine a preformed edible substance, of hand operated means and a hand grasp pivoted to said housing for intermittently expelling said preformed substance from said housing, means responsive to said hand operated means for embossing the expelled end surface of said preformed substance, and means responsive in timed relation to said expelling means for transversely severing an expelled portion of said preformed substance, said severing means responsive to the return displacement of said hand operated means to its initial inactive position.

12. In a portable plastic substance dispenser, the combination with a housing to totally confine a preformed edible substance, of means embodying a pair of racks and a common pinion for progressively expelling said preformed substance from said housing, means for transversely severing an expelled portion of said preformed substance in timed relation with said expelling means, a handle movably connected to said housing for approaching and receding displacement relative thereto, connections between said handle and said expelling means to eject the substance from said housing responsive to partial displacement of said handle toward said housing, and connections between said handle and said severing means for removing the ejected substance upon reverse displacement of said handle.

13. In a portable plastic substance dispenser, the combination with a housing to totally confine a preformed edible substance, of means for progressively expelling said preformed substance from said housing, means for transversely severing an expelled portion of said preformed substance in timed relation with said expelling means, a handle movably connected to said housing for approaching and receding displacement relative thereto, connections between said handle and said expelling means to eject the substance from said housing responsive to partial displacement of said handle toward said housing, connections between said handle and said severing means for removing the ejected substance upon reverse displacement of said handle, and means interposed between said handle and said embossing means to effect the impression of one surface of said ejected substance responsive to the reverse displacement of said handle towards its initial inactive position.

CHARLES DOERING.